Sept. 1, 1959  T. R. SEDDON  2,902,053
DOUBLE ACTING FLUID CONTROL VALVE
Filed Nov. 13, 1956  2 Sheets-Sheet 1

INVENTOR.
Thomas R. Seddon
BY Paul O. Pippel
Atty.

Sept. 1, 1959 T. R. SEDDON 2,902,053
DOUBLE ACTING FLUID CONTROL VALVE
Filed Nov. 13, 1956 2 Sheets-Sheet 2
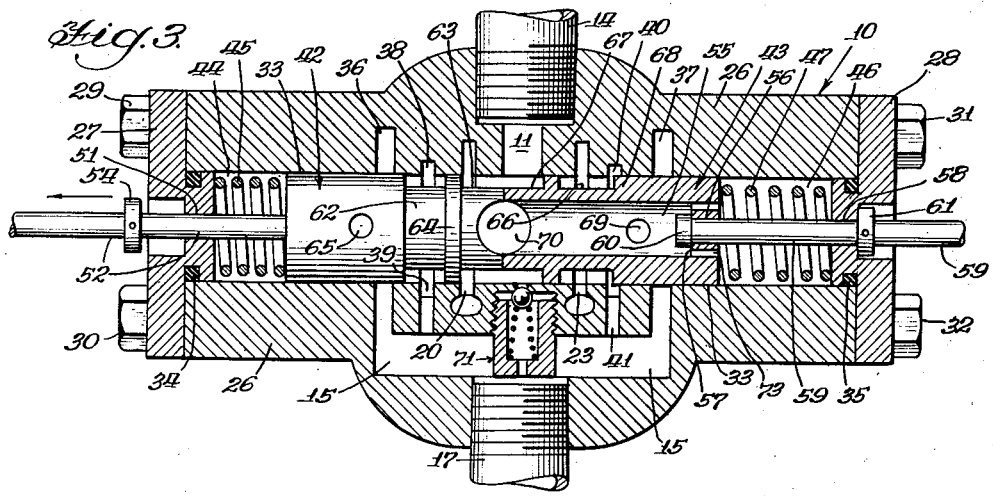
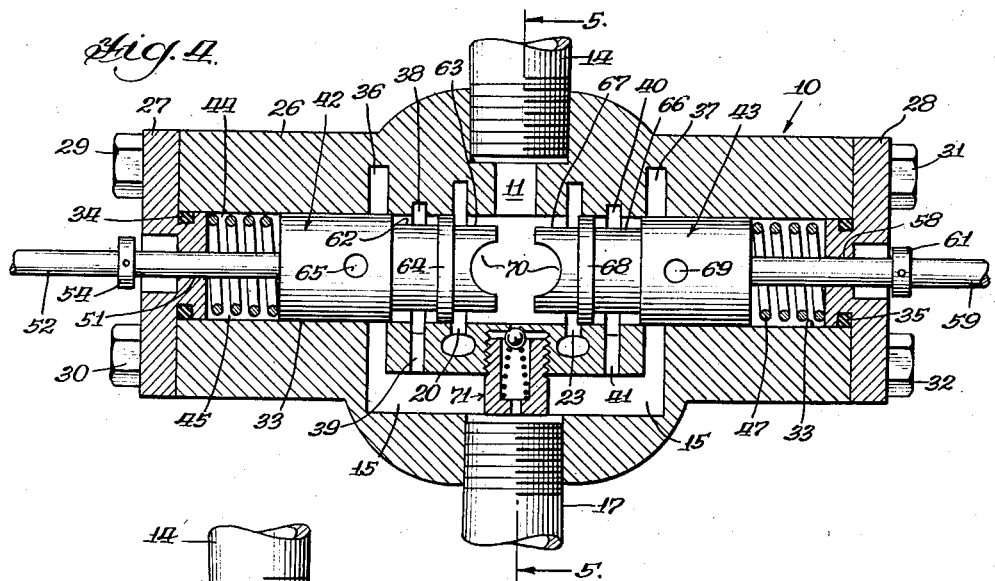
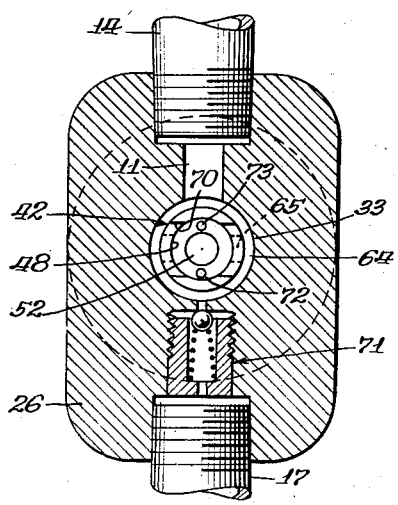
INVENTOR.
Thomas R. Seddon
BY Paul O. Pippel
Atty.

United States Patent Office 2,902,053
Patented Sept. 1, 1959

2,902,053

DOUBLE ACTING FLUID CONTROL VALVE

Thomas R. Seddon, Roselle, Ill., assignor to International Harvester Company, a corporation of New Jersey Application November 13, 1956, Serial No. 621,843

6 Claims. (Cl. 137—622)

This invention relates to a fluid control valve. More in particular this invention relates to a fluid control valve of simplified construction adapted for independently controlling a pair of one-way acting fluid motors.

In steering-by-driving vehicles such as crawler tractors, steering is effected by appropriately varying the relative movements of the ground engaging elements on either side of the vehicle. One method is to disengage either partly or totally the driving connection to one of the ground engaging elements. Another method for steering such vehicles is to brake one of the ground engaging elements to obtain a varied movement between the track engaging elements on one side of the vehicle with respect to the other side. Particularly in the larger type vehicles it is difficult for the operator to actuate clutches or brakes solely by manual effort. Actuation of such clutches or brakes is usually accomplished by assistance of power devices such as fluid motors. It is a prime object of this invention to provide a fluid control valve for operating a pair of single-acting fluid motors.

It is a further object of this invention to provide a double acting fluid control valve whereby a pair of single-acting fluid motors may be independently operated.

A still further object of this invention is to provide a double acting fluid control valve according to the preceding objects which by-passes the fluid when the control valve is in neutral position.

Another object of the invention is to provide a fluid control valve in accordance with the preceding objects which is of a relative inexpensive and simple construction and requires but a small space.

These and other desirable objects inherent in and encompassed by the invention will be more readily understood from the ensuing description of a preferred embodiment, the appended claims and the annexed drawings wherein:

Figure 3 is a vertical section of the valve similar to Figure 2 except that the valve plungers are in an operating position to energize one of the two fluid motors.

Figure 4 is a vertical section of the valve similar to Figures 2 and 3 except that the valve plungers are in an operating position to energize two fluid motors simultaneously.

Figure 5 is a section of the valve taken on the line 5—5 of Figure 4 illustrating additional details of the valve construction.

Figure 1:
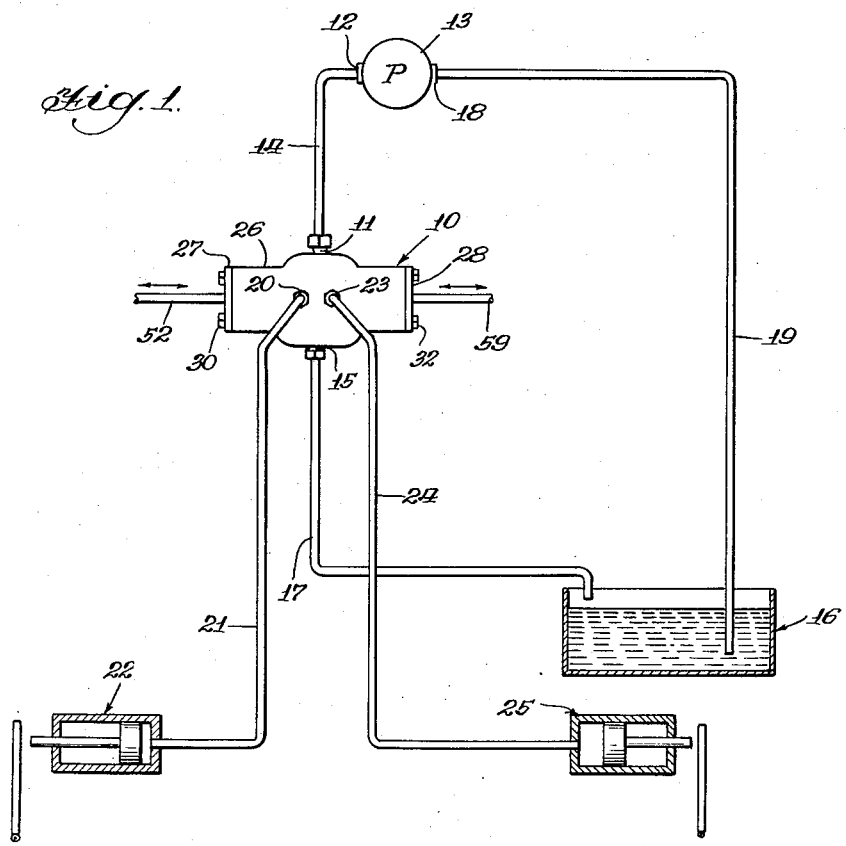
Figure 1 is a schematic drawing of a fluid circuit employing the double acting valve of this invention.

Referring to the drawings, it will be seen from Figure 1 that the numeral 10 generally indicates the double acting fluid control valve of this invention in a particular environment. The inlet port 11 of the valve 10 is connected to the output side 12 of a fluid pump 13 through a fluid conduit 14. The exhaust port 15 is connected to a fluid reservoir generally indicated at 16 through a fluid conduit 17. It will be appreciated that in the event that where the fluid employed is a gas such as air instead of a liquid the reservoir 16 becomes the open atmosphere. The reservoir 16 is adapted to provide fluid to the input side 18 of the pump 13 through the connecting conduit 19. A first motor port 20 is provided on the valve 10 and is connected through conduit 21 to a single-acting first fluid motor generally indicated at 22 which motor is adapted to actuate a steering clutch or brake mechanism (not shown) on one side of a vehicle such as a tractor (not shown). A second motor port 23 is provided on the valve 10 and is connected through conduit 24 to a single-acting fluid motor generally indicated at 25 which motor is adapted to actuate a steering clutch or brake mechanism (not shown) on the other side of the above referred to vehicle such as a tractor (not shown).

Figure 2:
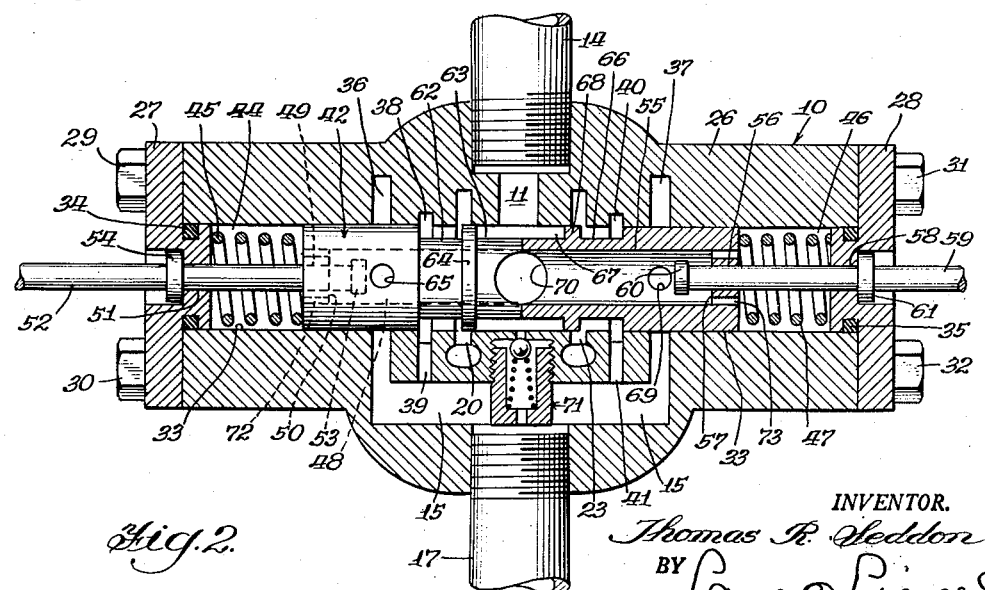
Figure 2 is a vertical section of the valve of this invention illustrating the neutral position.

Referring now to Figure 2, the valve 10 is comprised of a housing or casing 26 which includes end plates 27 and 28 rigidly connected by a series of annularly disposed threadedly fit bolts, some of which are indicated at 29, 30, 31 and 32. The casing 26 is provided with a longitudinally disposed large bore 33. The end plates 27 and 28 may be flanged on the inner portions thereof for reception into the large bore 23 and may be provided with annular packing 34 and 35 to prevent leakage of fluid therethrough. The casing 10 is provided with a first annular groove 36 which is communicatively connected for fluid flow with the exhaust port 175. In longitudinal spaced relation with respect to the first annular groove 36 is a second annular groove 37 which is also communicatively connected with the exhaust port 15. It will be noted that both the annular grooves 36 and 37 are in communication with the large bore 33.

The casing 26 is also provided with an annular shaped first discharge passage 38 which is communicatively connected to the exhaust port 15 through a radially disposed hole 39. In addition, in the casing 26 there is provided an annular shaped second discharge passage 40 which is communicatively connected to the exhaust port 15 through a radially disposed hole 41. It will be noted from the drawings that the motor ports 20 and 23 may be annularly shaped in the casing 26 and in communication with the large bore 33. It will also be noted that the inlet port 11 is communicatively connected with the large bore 33.

Within the large bore 33 is disposed in slidable relation a first valve plunger generally indicated at 42. Symmetrically constructed with reference to the first valve plunger 42 and in slidable relation in the large bore 33 is a second valve plunger generally indicated at 43. Adjacent the first valve plunger 42 in the large bore 33 is a first chamber 44 formed by the plunger 42 with the casing 26 and end plate 27. Within the first chamber 44 is a first helical spring 45 under compression which spring urges the plunger 42 in one direction. Similarly adjacent the second valve plunger 43 in the large bore 33 is a second chamber 46 formed by the plunger 43 with the casing 26 and end plate 28. Within the second chamber 46 is a second helical spring 47 under compression which spring urges the plunger 43 in the other or opposite direction. The springs 45 and 47 should be of balanced characteristics. Thus the springs 45 and 47 urge the valve plungers 42 and 43 toward each other in opposing relation.

Now the first valve plunger 42 is provided with an internal or first bore 48 extending longitudinally and coaxial with the large bore 33. On the outer end portion of the plunger 42 the first bore 48 is of a reduced diameter as shown at 49 which forms an annular shoulder at 50. Coaxial with the large bore 33 in the end plate 27 is a bore 51 extending therethrough. Disposed in slidable relation in the bores 51 and 49 is a rod or first control lever 52. The lever 52 is provided with a head 53 engageable with the shoulder 50 of the plunger 42. Also disposed on the shank of the lever 52 is a stop element 54 which limits the inward movement of the lever 42 by its engagement with the end plate 27.

Likewise, the second valve plunger 43 is provided with an internal or second bore 55 extending longitudinally and coaxial with the large bore 33. The second bore 55 is substantially of the same diameter as that of the first bore 48. On the outer end portion of the second valve plunger 43 the second bore 55 is of a reduced diameter as shown at 56 forms an annular shoulder at 57. Coaxial with the large bore 33 in the end plate 28 is a bore 58 extending therethrough. Disposed in slidable relation in the bores 56 and 58 is a rod or second control lever 59. The lever 59 is provided with a head 60 engageable with the shoulder 57 of the plunger 43. Also disposed on the shank of the lever 59 is a stop element 61 which limits the inward movement of the lever 59 by its engagement with the end plate 28.

The first valve plunger 42 is provided with a first circumferential groove 62 and an annularly shaped first circumferential space 63 separated by a first land 64. The outer end portion of the first valve plunger 42 is provided with a radially disposed first discharge port 65 which is positioned to register for fluid communication from the first bore 48 to the exhaust port 15 through the first annular groove 36 when the valve plunger 42 is in neutral position as shown in Figure 2. Similarly, the second valve plunger 43 is provided with a second circumferential groove 66 and an annularly shaped second circumferential space 67 separated by a second land 68. The outer end portion of the second valve plunger 43 is provided with a radially disposed second discharge port 69 which is positioned to register for fluid communication from the first and second bores 48 and 55 to the exhaust port through the second annular groove 37 when the valve plunger is in neutral position as shown in Figure 2.

Centrally located with respect to the abutting inner ends of the first and second valve plungers 42 and 43 is a radially disposed large fluid passage 70 which communicates fluid flow from the inlet port 11 and the circumferential spaces 63 and 67 with the first and second bores 48 and 55.

Although forming no part of this invention, the valve 10 is provided with a fluid pressure relief mechanism generally indicated at 71. The pressure relief mechanism 71 is of well known ball type construction and is adapted to open fluid communication from the inlet port 11 through the circumferential spaces 63 and 67 to the exhaust port 15 when the fluid pressure in the inlet port 11 exceeds a predetermined limit.

Now in order to prevent movement of the valve plungers 42 and 43 due to fluid pressure entering the inlet port 11 to the large bore 33 to cause a piston action tending to further compress the springs 45 and 47 thereby separating the abutting relation of the plungers 42 and 43, a series of longitudinally disposed bleeder passages 72 and 73 are provided in the respective outer end portions of the valve plungers 42 and 43 which communicates fluid flow from the first and second bores 48 and 55 into the chambers 44 and 46. Thus the fluid pressure is always equalized on both sides of each of the plungers 42 and 43 thereby preventing any movement of the plungers 42 and 43 by reason of fluid pressure piston action thereon. From this it can be seen that longitudinal movement of the valve plungers 42 and 43 is independent of fluid pressure in the valve 10.

Having now described the construction of a preferred embodiment of the invention, the operation thereof will now be discussed.

*Operation*

Assuming that the pump 13 is in operation to provide the necessary flow of fluid, it will be seen from Figure 2 that when the valve 10 is in a neutral position fluid enters the inlet port 11 and passes into the annular shaped circumferential spaces 63 and 67. The fluid from the spaces 63 and 67 then passes radially through the large fluid passage 70 into the longitudinal bores 48 and 55 of the plungers 42 and 43 respectively. The fluid then passes radially through the discharge ports 65 and 69 of the plungers 42 and 43, respectively, into the annular grooves 36 and 37 of the casing 26. From the grooves 36 and 37 the fluid passes into the exhaust port 15 and thence to the conduit 17 back to the reservoir 16. Thus it can be seen that when the valve 10 is in a neutral position as illustrated in Figure 2 the fluid from the pump 13 is by-passed back to the reservoir at low pressure. It will be noted from Figure 2 that when the valve 10 is in a neutral position the lands 64 and 68 of the plungers 42 and 43 are not entirely in registration with the respective motor ports 20 and 23, respectively, thus permitting return fluid from the respective motors 22 and 25 to discharge into the circumferential grooves 62 and 66 of the plungers 42 and 43, respectively, and thence through the discharge passages 38 and 40 and associated holes 39 and 41 of the casing 26 into the exhaust port 15. From this it can also be seen that when the valve 10 is in a neutral position both fluid motors 22 and 25 are permitted to discharge fluid in reverse direction through the respective conduits 21 and 24.

Now suppose the operator desires to energize the fluid motor 22. He moves the first control lever 52 leftwardly or outwardly to engage the head 53 of the lever 52 with the annular shoulder 50 of the plunger 42. This movement of the lever 52 causes the plunger 42 to move leftwardly or outwardly thereby further compressing the first helical spring 45 as shown best in Figure 3. Since no manual tension is exerted by the operator on the second control lever, the plunger 43 follows the leftward movement of the plunger 42 through the urging of the second helical spring 47 thereby maintaining the abutting relation of the plunger 43 with the plunger 42. It will also be seen that the leftward movement of the plunger 43 causes the engagement of the annular shoulder 57 of the plunger 43 with the head 60 of the second control lever 59 thereby moving the lever 59 inwardly. The valve 10 is now in an operating position as shown in Figure 3.

From Figure 3 it will be seen that the discharge ports 65 and 69 of the respective plungers 42 and 43 are moved out of registration with the annular grooves 36 and 37, respectively, of the casing 26. Thus the by-passing of fluid from the inlet port 11 to the exhaust port 15 is terminated and the pressure of the fluid at the inlet port 11 will rise as a consequence thereof. Fluid pressure from the inlet port 11 passes into the circumferential spaces 63 and 67 of the respective plungers 42 and 43. The leftward movement of the plunger 42 correspondingly moves the land 64 to permit complete registration of the first motor port 20 with the circumferential space 63 thus communicatively connecting the circumferential space 63 with the motor port 20 to cause fluid under pressure to flow from the inlet port 11 to the fluid motor 22 through the circumferential spaces 63 and 67 into the motor port 20 and the conduit 21 to the motor 22. Meanwhile the position of the plunger 43 permits the continuance of flow of return fluid from the fluid motor 25 through the conduit 24 and motor port 23 into the second circumferential groove 66 which groove is in registration with the motor port 23 and the discharge passage 40 and associated hole 41. The hole 41 being in communication with the exhaust port 15 permits the fluid from the groove 66 to discharge into the exhaust port 15. Thus when the valve 10 is in an operating position illustrated in Figure 3, the by-pass circuit is terminated and the discharge of the return fluid from the motor 25 in reverse direction through the conduit 24 is maintained while the motor 22 is energized by fluid under pressure from the pump 13.

From an examination of Figures 2 and 3 with the foregoing discussion it will be readily appreciated by those skilled in the art that if the operator chose to energize the motor 25 instead of the motor 22, he would actuate the second control lever 59 instead of the lever 52. The movement of the plungers 42 and 43 in the rightward direction similarly terminates the by-pass of the flow of fluid as shown in Figure 2 and directs the fluid under pressure in the inlet port 11 to the motor port 23 to energize the fluid motor 25 while maintaining communication of the motor port 23 with the exhaust port 15 to allow the return of fluid from the motor 22 through the conduit 21 in reverse direction.

From the foregoing it can be seen that either of the fluid motors may be energized while maintaining fluid discharge from the other motor or in the alternative neither of the motors may be energized. The energizing of both motors 22 and 25 simultaneously will now be described.

In the event that the operator desires to energize both fluid motors 22 and 25 simultaneously he moves outwardly both the levers 52 and 59. The leftward movement of the first control lever 52 causes the head 53 thereof to engage with the annular shoulder 50 of the first valve plunger 42 to move the plunger 42 outwardly thereby further compressing the spring 45 as shown in Figure 4. The leftward movement of the plunger 42 moves the first discharge port 65 out of registration with the first annular groove 36 thereby terminating flow of fluid therethrough from the first bore 48 of the plunger 42 into the exhaust port 15. The leftward movement of the plunger 42 also moves the first land 64 to terminate passage of fluid from the first motor port 20 into the discharge passage 38 and associated hole 39 through the first circumferential groove 62. Movement of the first land 64 opens communication between the first motor port 20 and the inlet port 11 through the first circumferential space 63.

The rightward movement of the second control lever 59 simultaneous with the leftward movement of the first control lever 52 causes the head 60 of the lever 59 to engage with the annular shoulder 57 of the second valve plunger 43 to move the plunger 43 rightwardly or outwardly thereby further compressing the spring 47. Thus it can be seen from Figure 4 that the plungers 42 and 43 are moved out of an abutting relationship from each other. The rightward movement of the plunger 43 moves the second discharge port 69 out of registration with the second annular groove 37 of the casing 26 thereby terminating flow of fluid therethrough from the second bore 55 of the plunger 43 into the exhaust port 15. Thus from Figure 4 it can be seen that the by-passing of fluid from the inlet port 11 to the exhaust port 15 is terminated. The rightward movement of the plunger 43 also moves the second land 68 to terminate passage of fluid from the second motor port 23 into the discharge passage 40 and associated hole 41 through the second circumferential groove 66. Movement of the second land 68 opens communication between the second motor port 23 and the inlet port 11 through the second circumferential space 67. From the above it is apparent that when both control levers 52 and 59 are each moved in an outward direction both the fluid motors 22 and 25 will become energized by fluid pressure emanating from the pump 13.

Obviously from the foregoing discussion should the control levers 52 and 59 be released by the operator, the valve 10 resumes the neutral position shown in Figure 2 through action of the balanced springs 45 and 47.

Having thus described an embodiment of the invention, it can now be seen that the objects of the invention have been fully achieved and it must be understood that changes and modifications may be made which do not depart from the spirit of the invention nor from the scope thereof as defined in the appended claims.

What is claimed is:

1. A double acting fluid control valve comprising a casing having an inlet port and an exhaust port, a large bore longitudinally disposed in said casing, a first valve plunger and a second valve plunger slidably disposed in opposing relation in said large bore, a first helical compression spring disposed in a first chamber in said large bore adapted to urge said first valve plunger in one direction, a second helical compression spring disposed in a second chamber in said large bore adapted to urged said second valve plunger in the other direction, a first bore disposed in said first valve plunger and a second bore disposed in said second plunger, said first and second bores being in axial alignment with each other and coaxial with respect to said large bore, said first valve plunger having a first circumferential groove disposed thereon, said first valve plunger having a first circumferential space disposed on the inner end portion thereof, a first land disposed on said first valve plunger positioned between said first circumferential groove and said first circumferential space, said second valve plunger having a second circumferential groove disposed thereon, said second valve plunger having a second circumferential space disposed on the inner end portion thereof, a second land disposed on said second valve plunger positioned between said second circumferential groove and said second circumferential space, a large fluid passage disposed in said valve plungers communicatively connecting said circumferential spaces with said first and second bores, first and second annular grooves disposed in said casing communicatively connected to said exhaust port, a first discharge port in said first valve plunger communicatively connected to said first bore and positioned in registerable relation with said first annular groove, a second discharge port in said second valve plunger communicatively connected to said second bore and positioned in registerable relation with said second annular groove, a first motor port disposed in said casing and positioned for selective registration with said first circumferential groove and said first circumferential space, a second motor port disposed in said casing and positioned for selective registration with said second circumferential groove and said second circumferential space, a first discharge passage disposed in said casing communicatively connecting said first circumferential groove with said exhaust port, a second discharge passage in said casing communicatively connecting said second circumferential groove with said exhaust port, a first control lever slidably mounted in said casing engageable with said first valve plunger and adapted to move said first valve plunger axially in the other direction, a second control lever slidably mounted in said casing engageable with said second valve plunger and adapted to move said second valve plunger in one direction, and bleeder passages disposed in said valve plunger communicatively connecting said chambers with said first and second bores.

2. A double acting fluid control valve comprising a casing, an inlet port and an exhaust port disposed in said casing, a first valve plunger and a second valve plunger mounted slidably in said casing in opposed relation, a first motor port and a second motor port disposed in said casing, means associated with said valve plungers for communicatively connecting said inlet port with said exhaust port when said valve plungers are in a neutral position, resilient means mounted in said casing adapted to urge said valve plungers toward each other in engaging relation, control means mounted on said casing adapted for moving said plungers in one direction to establish fluid communication from said inlet port to said second motor port and simultaneously maintain fluid communication from said first motor port to said exhaust port and alternately moving said plungers in the other direction to establish fluid communication from said inlet port to said first motor port and simultaneously maintain fluid communication from said second motor to said exhaust port, and said control means being adapted for simultaneously moving one of said plungers in one direction and the other plunger in the opposite direction to establish fluid communication from said inlet port to each of said motor ports.

3. A double acting fluid control valve comprising a casing, an inlet port and an exhaust port disposed in said casing, a first valve plunger and a second valve plunger mounted slidably in said casing in opposed abutting relation, a first motor port and a second motor port disposed in said casing, means associated with said valve plungers for communicatively connecting said inlet port with said exhaust port when said valve plungers are in a neutral position, resilient means mounted in said casing adapted to urge said valve plungers toward each other in engaging relation, a first control lever mounted in said casing engageable with said first valve plunger, a second control lever mounted in said casing engageable with said second valve plunger, said second control lever being operable to cause movement of said plungers and said first control lever in one direction from said neutral position to establish fluid communication from said inlet port to said second motor port while simultaneously establishing fluid communication from said first motor port to said exhaust port and terminating fluid communication from said inlet port to said exhaust port, said first control lever being operable to cause movement of said plungers and said second control lever in the other direction from said neutral position to establish fluid communication from said inlet port to said first motor port while simultaneously maintaining fluid communication from said second motor port to said exhaust port and terminating fluid communication from said inlet port to said exhaust port, said control levers being operable for moving said second valve plunger in one direction to establish fluid communication from said inlet port to said second motor port while moving said first valve plunger in the other direction to establish fluid communication from said inlet port to said first motor port and simultaneously terminating fluid communication from said inlet port to said exhaust port.

4. A double acting fluid control valve comprising a casing, an inlet port and an exhaust port disposed in said casing, a large bore disposed longitudinally in said casing, a first valve plunger and a second valve plunger slidably disposed in opposed relation in said large bore, a first chamber disposed in said large bore adjacent said first valve plunger, a second chamber disposed in said large bore adjacent said second valve plunger, said first chamber being connected for fluid flow with said inlet port and said second chamber, resilient means mounted in each of said chambers adapted to urge said valve plungers toward each other in abutting relation, a first motor port and a second motor port disposed in said casing, means associated with said valve plungers for communicatively connecting said inlet port and said motor ports with said exhaust port when said valve plungers are in a neutral position, a first control lever mounted in said casing engageable with said first valve plunger, a second control lever mounted in said casing engageable with said second valve plunger, said second control lever being operable to cause movement of said plungers and said first control lever in one direction from said neutral position to establish fluid communication from said inlet port to said second motor port while simultaneously maintaining fluid communication from said first motor port to said exhaust port and terminating fluid communication from said inlet port to said exhaust port, said first control lever being operable to cause movement of said plungers and said second control lever in the other direction from said neutral position to establish fluid communication from said inlet port to said first motor port while simultaneously maintaining fluid communication from said second motor port to said exhaust port and terminating fluid communication from said inlet port to said exhaust port, said control levers being operable for moving said second valve plunger in one direction to establish fluid communication from said inlet port to said second motor port while moving said first valve plunger in the other direction to establish fluid communication from said inlet port to said first motor port and simultaneously terminating fluid communication from said inlet port to said exhaust port.

5. A double acting fluid control valve comprising a casing, an inlet port and an exhaust port disposed in said casing, a large bore disposed longitudinally in said casing, said inlet port being communicatively connected to said large bore, a first valve plunger and a second valve plunger slidably disposed in opposed relation in said large bore, a first chamber disposed in said large bore adjacent said first valve plunger, a second chamber disposed in said large bore adjacent said second valve plunger, said first chamber being connected for fluid flow with said inlet port and said second chamber, resilient means mounted in each of said chambers adapted to urge said valve plungers toward each other in abutting relation, a first motor port and a second motor disposed in said casing, said motor ports being in fluid communication with said large bore, means associated with said valve plungers for communicatively connecting said inlet port and said motor ports with said exhaust port when said valve plungers are in a neutral position, a first control lever mounted in said casing engageable with said first valve plunger, a second control lever mounted in said casing engageable with said second valve plunger, said second control lever being operable to cause movement of said plungers and said first control level in one direction from said neutral position to establish fluid communication from said inlet port to said second motor port while simultaneously maintaining fluid communication from said first motor port to said exhaust port and terminating fluid communication from said inlet port to said exhaust port, said first control lever being operable to cause movement of said plungers and said second control lever in the other direction from said neutral position to establish fluid communication from said inlet port to said first motor port while simultaneously maintaining fluid communication from said second motor port to said exhaust port and terminating fluid communication from said inlet port to said exhaust port, said control levers being operable for moving said second valve plunger in one direction to establish fluid communication from said inlet port to said second motor port while moving said first valve plunger in the other direction to establish fluid communication from said inlet port to said first motor port and simultaneously terminating fluid communication from said inlet port to said exhaust port.

6. A double acting fluid control valve comprising a casing, an inlet port and an exhaust port disposed in said casing, a large bore disposed longitudinally in said casing, said inlet port being communicatively connected to said large bore, a first valve plunger and a second valve plunger slidably disposed in opposed relation in said large bore, a first chamber disposed in said large bore adjacent said first valve plunger, a second chamber disposed in said large bore adjacent said second valve plunger, said first chamber being connected for fluid flow with said inlet port and said second chamber, resilient means mounted in each of said chambers adapted to urge said valve plungers toward each other in abutting relation, a first motor port and a second motor port disposed in said casing, said motor ports being in fluid communication with said large bore, means associated with said valve plungers for communicatively connecting said inlet port and said motor ports with said exhaust port when said valve plungers are in a neutral position, a manually operable first control lever slidably mounted in and projecting externally of said casing, said first control lever being positioned in engageable relation with said first valve plunger, a manually operable second control lever slidably mounted in and projecting externally of said casing, said second control lever being positioned in engageable relation with said second valve plunger, said second control lever being operable to cause movement of said plungers and said first control lever in one direction from said neutral position to establish fluid communication from said inlet port to said second motor port while simultaneously maintaining fluid communication from said first motor port to said exhaust port and terminating fluid communication from said inlet port to said exhaust port, said first control lever being operable to cause said plungers and said second control lever in the other direction from said neutral position to establish fluid communication from said inlet port to said first motor port while simultaneously maintaining fluid communication from said second motor port to said exhaust port, said control levers being operable for moving said second valve plunger in one direction to establish fluid communication from said inlet port to said second motor port while moving said first valve plunger in the other direction to establish fluid communication from said inlet port to said first motor port and simultaneously terminating fluid communication from said inlet port to said exhaust port.

References Cited in the file of this patent
UNITED STATES PATENTS

| | | |
|---|---|---|
| 1,990,798 | Richter et al. | Feb. 12, 1935 |
| 2,343,689 | Mercier | Mar. 7, 1944 |
| 2,387,007 | Buchanan | Oct. 16, 1945 |
| 2,397,299 | Strid | Mar. 26, 1946 |
| 2,544,990 | Harrington et al. | Mar. 13, 1951 |
| 2,691,990 | Ashton et al. | Oct. 19, 1954 |
| 2,745,433 | Schneider et al. | May 15, 1956 |
| 2,783,745 | Stephens | Mar. 5, 1957 |